United States Patent [19]

Robinson et al.

[11] Patent Number: 4,526,767
[45] Date of Patent: Jul. 2, 1985

[54] PROCESS FOR THE PRODUCTION OF ZSM-5 ZEOLITE

[75] Inventors: Joseph G. Robinson, Winchcombe; David I. Barnes, Cheltenham, both of England

[73] Assignee: Coal Industry (Patents) Ltd., London, England

[21] Appl. No.: 560,926

[22] Filed: Dec. 13, 1983

[30] Foreign Application Priority Data

Jan. 11, 1983 [GB] United Kingdom ................. 8300662
May 20, 1983 [GB] United Kingdom ................. 8314000

[51] Int. Cl.$^3$ ............................................. C01B 33/28
[52] U.S. Cl. ................................... 423/329; 423/328; 502/77
[58] Field of Search .................... 502/77, 60; 423/328, 423/329, 330–333

[56] References Cited

U.S. PATENT DOCUMENTS 3,676,063  7/1972  Elo, Jr. et al. ...................... 423/328
3,702,886  11/1972 Argaver et al. ..................... 423/328
4,407,728  10/1983 Ball et al. ............................ 423/328

FOREIGN PATENT DOCUMENTS 0002899   7/1979   European Pat. Off. .
56-160315 12/1981  Japan .
2066230   7/1981   United Kingdom .
2071632   9/1981   United Kingdom .

OTHER PUBLICATIONS

*Hackh's Chemical Dictionary* 4th Ed., 1969, McGraw-Hill Inc., p. 27.
Chemical Abstracts, vol. 73, 1970, p. 115, No. 79131g.

*Primary Examiner*—Gary P. Straub
*Assistant Examiner*—Jackson Leeds
*Attorney, Agent, or Firm*—Stevens, Davis, Miller & Mosher

[57] ABSTRACT

Catalysts of the ZSM-5 synthetic zeolite type can be prepared by heating a mixture of a precursor for an alumina hydrate, a precursor for silica hydrogel, an alkali metal hydroxide and water together with an organic templating agent selected from the group of carboxymethylcellulose, the condensation product of an alkanolamine and a fatty acid and cellulose hydroxyethyl ether and therafter heating the reaction product under autogeneous conditions. Unlike prior proposals ZSM-5 which is uncontaminated by other zeolites, is prepared in high yield.

6 Claims, No Drawings

PROCESS FOR THE PRODUCTION OF ZSM-5 ZEOLITE

This invention concerns improvements in catalyst production, more especially it concerns the preparation of synthetic zeolite catalysts.

A class of crystalline synthetic zeolites and their preparation is disclosed in U.S. Pat. No. 3,702,886. Although the patent gives the whole class the designation "ZSM-5", the title ZSM-5 has tended to be applied to the preferred members of the class. Considerable interest has been expressed in this catalyst because of its properties as an isomerisation and hydrocarbon conversion catalyst and particularly in its ability to convert lower oxygen-containing aliphatics into hydrocarbons, including those boiling in the gasoline range. The U.S. Pat. No. 3,702,886 teaches the preparation of ZSM-5 by crystallisation from a reaction mixture of a tetrapropylammonium compound, sodium oxide, aluminium oxide, silicon oxide and water.

We have carried out the preparation of ZSM-5 in accordance with the teaching of U.S. Pat. No. 3,702,886, using tetrapropylammonium hydroxide as a templating reagent. However, under the reaction conditions described in the Example hereinafter, zeolite ZSM-5, identified by X-ray powder diffraction data in agreement with published data, was formed, together with an amount of an unidentified zeolite. Our studies using scanning electron microscopy showed the presence of two principal crystal morphologies, but we have not yet established which is ZSM-5. For convenience, we have designated the unidentified zeolite as "Phase B" to distinquish it from another aluminosilicate which is formed if no organic templating reagent is present in the reaction mixture and which we have found contaminating ZSM-5 samples prepared using a wide variety of reagents, and which we have designated as "Phase A".

British Published Patent Specification No. 2,071,632A discusses further methods of preparation of ZSM-5 catalysts by using as a component of the reaction mixture, instead of a nitrogenous organic base, an organic compound containing hydroxyl functions, such as alcohols especially glycerol, phenols, glycols, polyglycols, polyhydroxyl compounds and those which evolve hydroxyl or polyhydroxyl compounds, in the presence of alkali metal cations or alkaline earth metal cations.

Another British Published Patent Specification, No. 2,018,232A, describes how the use of alcohols such as n-butanol as templating reagents, leads to the formation of zeolites heavily contaminated with amorphous material, and claims that the use of an alcohol, especially an unbranched primary alcohol such as n-butanol, together with ammonia can produce crystalline zeolites.

We have now discovered another route to the crystalline aluminosilicate ZSM-5 catalysts which, at least in the preferred aspects of the invention, leads to essentially complete conversion of the reactants to this catalyst, without the co-formation of other aluminosilicates.

The present invention provides a process for the production of ZSM-5 synthetic zeolite catalysts comprising mixing a precursor for an alumina hydrate, a precursor for silica hydrogel, an alkali metal hydroxide and water together with an organic templating reagent selected from the condensation product of an alkanolamine and a fatty acid, carboxymethylcellulose and cellulose hydroxyethyl ether, and thereafter heating the reaction product under autogenous conditions.

It is not believed that any of the above templating reagents have previously been suggested for use in the preparation of synthetic zeolite catalysts. Carboxymethyl cellulose is preferably used in alkali metal, especially sodium, salt form, corresponding to the alkali metal hydroxide used in the reaction; the sodium salt is commercially available as "Blanose CMC". A preferred source of cellulose hydroxyethel ether is the commercial product "Natrosol 250". Both "Blanose CMC" and "Natrosol 250" are marketed by Hercules Ltd. These reagents are not excessively expensive and are readily commercially available; not only does the present invention provide an alternate route to the ZSM-5 product but can provide a very high quality, pure product.

The precursor for alumina hydrate is suitably a water soluble aluminate, an aluminium salt or an organo-metallic compound such as an aluminium alkyl or alkoxide, but is preferably a salt, most preferably aluminium nitrate, preferably present as a solution in a lower alkanol, especially ethanol.

The alkali metal hydroxide may be potassium hydroxide or, preferably, sodium hydroxide, preferably used in aqueous solution, and the reaction takes place in an aqueous medium which is deionised or distilled water. The precursor for silica hydrogel is preferably tetraethyl ortho silicate, but also to be considered are silicon tetrachloride, pyrogenic silica, sodium silicate or generally any silicon compound capable of yielding silica hydrogel under the alkaline conditions of the reaction mixture.

The primary reaction, which yields a gelatinous mass, is carried out in an inert atmosphere, for example nitrogen, and takes place at ambient temperature, although the temperature may be varied up to about 80° C. if desired. The primary reaction is suitably carried out under vigorous agitation.

The primary reaction product is then heated, preferably at a temperature of 100° to 250° C., more preferably 150° to 200° C. and under autogenous pressure. Preferably, the gelatinous mass is agitated during this heating, which may be carried out for a few hours to 6 weeks. The resulting catalyst is then preferably washed and calcined and may be cation exchanged in known manner. The hydrogen form of the catalyst is preferred.

Uses for ZSM-5 type catalysts are known, and the catalysts prepared according to the invention demonstrate activity at least comparable with that of commercially available ZSM-5 catalysts in the conversion of methanol into lower hydrocarbons, in disproportionation, isomerisation and transalkylation reactions.

The invention will now be described by way of example only.

EXAMPLE 56 g of an ethanolic solution of aluminium nitrate (120 g $Al(NO_3)_3 \cdot 9H_2O/l$ of absolute ethanol) were vigorously mixed with 60 g of tetraethyl ortho silicate under a dry nitrogen atmosphere. After thorough mixing, 11 g of the selected organic templating reagent were added, followed immediately by 375 g of distilled water. The mixture was stirred vigorously for several minutes further and 130 g of sodium hydroxide solution were added (46 g NaOH/l distilled water). Vigorous stirring was continued and after about two minutes gelation occurred. The gelatinous mass was transferred to a number of small stainless steel tubes, which were sealed and placed in an oven at 175° C., where they were rotated end-over-end for seven days.

After water washing and drying, the product was characterised by X-ray powder diffraction, using Ni-filtered Ka-Cu radiation and employing a Guinier focussing camera, and the d-spacing values were compared with those obtained for a sample of ZSM-5 prepared following the procedure described in U.S. Pat. No. 3,702,886 but using the same reaction and processing conditions as above. An identical crystal structure was demonstrated but the comparison sample appeared to contain another aluminosilicate material (Phase B); this matter was absent from the product according to the invention.

The above described procedure was carried out using as the organic templating reagent, Natrosol 250" and "Blanose CMC". In each case ZSM-5 was obtained in high yield and no Phase A or Phase B material was detected. Scanning electron microscopy using a Phillips 501A instrument showed prismatic crystals of average length 2 microns which were rather better developed than the corresponding crystals prepared using tetrapropylammonium hydroxide, which ranged from 0.5 to 1.5 microns in length.

Test samples of each sample of ZSM-5 produced as above were converted into the hydrogen form in known manner, and tested as catalysts for the conversion of methanol into hydrocarbons. High conversion was observed and the product distribution was in each case essentially identical to ZSM-5 produced according to U.S. Pat No. 3,702,886.

Compositive tests using as templating agent the following reagents: dodecylbenzene sulphonate; "Montanol 500", a $C_5$–$C_{10}$ aliphatic alcohol mixture; trisodium N-hydroxyethyl EDTA; tetrasodium EDTA; "Dresinate 731", containing sodium abietate; 8-hydroxy quinoline; monoethanolamine; monoisopropanolamine; acetone and Alizarin Red S, did yield ZSM-5, together with "Phase A" crystalline aluminosilicate. Tetrahydrofuran yielded "Phase A" alone, and a number of other compounds including: alkylphenol ethylene oxide condensates; fatty alcohol ethylene oxide condensates; di-isopropanolamine; 2,4-pentanedione; the trisodium salt of nitriloacetic acid; citric acid and 1,2,3-propanetricarboxylic acid, did not promote the formation of crystalline products.

We claim:

1. A process for the production of crystalline ZSM-5 synthetic zeolite, comprising mixing a presursor for an alumina hydrate, a precursor for silica hydrogel, an alkali metal hydroxide and water together with an organic templating reagent selected from carboxymethylcellulose and cellulose hydroxyethyl ether, and thereafter heating the reaction product under autogenous conditions.

2. A process as claimed in claim 1, wherein the precursor for alumina hydrate is selected from water soluble aluminates, aluminium salts and aluminium alkyls and alkoxides.

3. A process as claimed in claim 2, wherein the precursor for alumina hydrate is an aluminium salt in solution in ethanol.

4. A process as claimed in claim 1, wherein the alkali metal hydroxide is sodium hydroxide.

5. A process as claimed in claim 1, wherein the precursor for silica hydrogel is selected from tetraethyl ortho silicate, silicon tetrachloride, pyrogenic silica and sodium silicate.

6. A process as claimed in claim 1, wherein the heating step is carried out at a temperature of 100° to 250° C.

* * * * *